Figure 1:
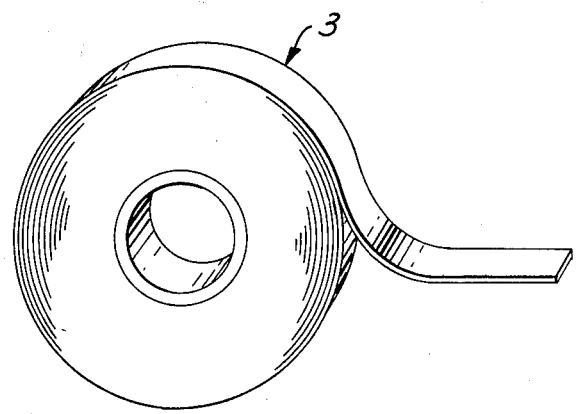

United States Patent [19]
Snell et al.

[11] 3,876,454
[45] Apr. 8, 1975

[54] LINERLESS PRESSURE-SENSITIVE ADHESIVE TAPE HAVING ELASTOMERIC BACKING

[75] Inventors: Robert B. Snell, White Bear Lake; W. Pierce Smith, Richfield, both of Minn.

[73] Assignee: Minnesota Mining and Manufacturing Company, St. Paul, Minn.

[22] Filed: Mar. 28, 1973

[21] Appl. No.: 345,569

[52] U.S. Cl. ...... 117/122 P; 117/138.8 E; 161/167; 174/84 R; 260/897 A; 260/825
[51] Int. Cl. .......................... C09j 7/02; A61l 15/06
[58] Field of Search ... 161/167; 117/122 P, 122 PF, 117/122 PA, 226, 68.5; 206/59 C; 260/889; 174/84 R

[56] References Cited
UNITED STATES PATENTS
| | | | |
|---|---|---|---|
| 2,882,183 | 4/1959 | Bond et al. | 161/167 |
| 3,265,769 | 8/1966 | Schaffhausen | 117/122 PF |
| 3,470,127 | 9/1969 | Snell | 260/889 |
| 3,778,306 | 12/1973 | Stow | 117/226 |

*Primary Examiner*—George F. Lesmes
*Assistant Examiner*—R. J. Roche
*Attorney, Agent, or Firm*—Alexander, Sell, Steldt and DeLaHunt

[57] ABSTRACT

Pressure-sensitive tapes having an elastomeric backing coated on one major surface with normally tacky pressure-sensitive adhesive provide an insulating material which has immediate adhesion to electrical conductors and can be wound thereabout to provide an insulating sheath having high resistance to electrical loss. The tape can be wound upon itself in roll form and thereafter easily dispensed without the use of a barrier layer such as a liner or a low adhesion backsize coating.

3 Claims, 2 Drawing Figures

LINERLESS PRESSURE-SENSITIVE ADHESIVE TAPE HAVING ELASTOMERIC BACKING

BACKGROUND OF THE INVENTION

This invention relates to pressure-sensitive adhesive tape having an elastomeric backing, especially electrical insulating tape. More particularly, the invention relates to preparing such a tape in roll form.

Because elastomeric backed electrical insulating tapes are excellent insulators and are highly conformable, they are especially useful in wrapping cable splices to replace insulation previously removed from the conductors. Such tapes can be simply a stretchable elastic rubbery strip which, when elongated or stretched more than about 50% beyond its natural dimensions and overlapped, has the property of self-adhesion or self-fusion. Such tapes are commonly called "self-fusing" tapes because the spirally overlapping layers tend to lose their identity and form a unitary sheath. Self-fusing tapes are disclosed in U.S. Pat. Nos. 2,569,540, 2,569,541, 3,334,063, 3,379,569, 3,470,127 and 3,684,644. Pressure-sensitive adhesive tapes having an elastomeric backing coated on one major surface with normally tacky adhesive are also known; e.g., see U.S. Pat. Nos. 2,882,183 and 3,684,644.

The self-fusing tapes and the elastomeric-backed pressure sensitive adhesive tapes suffer from a common deficiency in that they both require the use of a liner or barrier layer between adjacent layers of convolutions to prevent blocking when they are wound about themselves in roll form. Such blocking is understandably inherent in self-fusing tapes, since adjacent layers are compounded of elastomeric materials which are intended to block or self fuse. Pressure-sensitive adhesive tapes having elastomer backings also block easily, since the adhesive is almost always based upon an elastomer which is very compatible with the backing elastomer.

Liners and low-adhesion backsize layers in tape rolls are undesirable for a variety of reasons. Liners must be removed and discarded during application, creating extra work and causing a disposal problem for the user. Low-adhesion backsize coatings must be applied with great care to get the proper uniformity, usually require expensive materials, and thus increase the cost of the tape. Additionally, rolls of both low-adhesion backsize coated tapes and tapes employing liners are loosely wound and therefore tend to unwind inadvertently. Such a deficiency may be appreciated by considering the plight of a workman atop a utility pole attempting to tape a splice and having the roll fall free while he holds one end of the tape. The roll, under such circumstances, will completely unwind, leaving the workman with the choice of rewinding the roll or completely discarding it.

Prior to the present invention, no one has devised an acceptable commercial pressure-sensitive tape having an elastomeric backing which can be stored in roll form without blocking unless it had a liner or low adhesion backsize coating.

SUMMARY OF THE INVENTION

The present invention provides a linerless elastomer backed, pressure-sensitive adhesive tape which is particularly suited for use as an electrical insulating tape. The tape may be wound upon itself for storage and is thereafter capable of being readily unwound even after storage for long periods of time under a variety of temperatures and atmospheric conditions. The roll of tape resists inadvertent unwinding; yet the tape can readily be dispensed. The tape also has immediate adhesion, assures environmental protection when applied to a workpiece, and provides a good balance of physical, chemical and electrical properties desired for electrical insulating uses.

DRAWING

Figure 2:
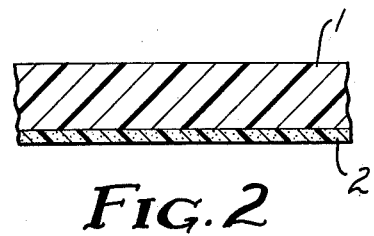

The invention is illustrated in the accompanying drawing wherein:

FIG. 1 shows a roll of the linerless elastomeric backed pressure-sensitive adhesive tape; and FIG. 2 shows an enlarged diagrammatic edge view of the tape of FIG. 1.

The tape, as shown in FIGS. 1 and 2, comprises a strip or ribbon 1 of an elastomeric material which is coated over one major surface with a layer 2 of normally tacky pressure-sensitive adhesive formed of an elastomeric material which is physically incompatible with that comprising the backing, as will hereinafter be explained. Quite surprisingly, it has been discovered that such a tape can be wound as a roll 3 on itself without requiring a liner or low adhesion backsize coating, stored at temperatures as high as 150°F. for as long as 24 hours, and thereafter readily unwound without delamination, offsetting of the adhesive or blocking of the layers. Rather, on unwinding, the tape of the invention cleanly separates at the interface between the tape and adjacent backing. Heretofore it would have generally been expected that the adhesive would invariably block or comingle with the elastomeric backing such that it would be impossible to obtain such clean separation.

An important advantage of the tape of this invention is that it has immediate adhesion to the bare metal surface of a conductor on which it is to be used as insulation, as well as to the surface of the original insulation on the conductor and to itself. The result of this immediate adhesion is that application of the tape is easier, the newly insulated conductor or conductors may be put into service immediately, and a sheath of tape need not be overwrapped with a plastic tape, as was often done in the past to hold a self-fusing tape tightly enough to provide moisture and electrical resistance.

Briefly, the tape of this invention comprises a selected, tacky, pressure-sensitive adhesive which is firmly united to an elastomeric rubbery sheet which is capable of being stretched at least 50% of its original length without breaking. A primer may be required in some instances to firmly unite the pressure-sensitive adhesive to the backing layer. The elastomeric backing layer of the tape of the invention comprises an elastomer blended together with various additives such as fillers, plasticizers, tackifiers, cross-linking agents, antioxidants, etc. The term "elastomer" as used in the application has its conventional meaning as described in Textbook of Polymer Chemistry, Billmeyer, Jr., Interscience Publishing Company (New York, 1957), pages 154–155. The pressure-sensitive adhesives are also comprised of elastomeric materials which may be blended with tackifiers, plasticizers, and other additives. The adhesives are aggressively tacky in their normal dry state on the tape and have a proper balance of cohesion, stretchiness and elasticity which permits the adhesive tape to stick on mere pressing yet be stripped from a surface without delamination or offset of the adhesive.

It has been discovered that a pressure-sensitive adhesive which is physically incompatible with the elastomeric backing may be coated to provide an elastomer-backed pressure-sensitive adhesive tape which can be wound directly upon itself and easily dispensed thereafter without requiring a liner or low adhesion backsize, provided that the adhesive has the right balance of adhesion, cohesiveness, elasticity and strength for the strength and the elasticity of a particular backing. In other words, not all adhesives that are physically incompatible with a given elastomeric backing will be suitable for use in an elastomer backed tape. Even though some are initially physically incompatible, they may eventually block, transfer or split and even cause the backing to excessively elongate, break or unwind.

The following simple test has been devised to determine the suitability of various pressure-sensitive adhesives with various elastomeric backing sheets. A layer of the pressure-sensitive adhesive to be tested is first uniformly coated on the flat polished surface of a stainless steel plate to provide a dry coating at least one inch wide, 6 inches long, and about 1 mil thick. Next, a 1-inch wide 5–6 inch long strip of the elastomeric backing material being tested is adhered to the surface of the dried pressure-sensitive adhesive by smoothly placing it thereon and passing a 2.2 lb rubber surfaced roller two times thereover, while leaving approximately 1-inch of one end of the backing free. The adhesive-backing combination is then conditioned at 150°F. for 24 hours. Finally, the free end of the backing is clamped in one of the sample holding jaws of an "Instron" tensile testing device, the exposed end of the steel plate adjacent the free end of the backing and the free end of the backing is pulled over itself at a 180° stripping angle at a crosshead speed of 12 inches per minute. The adhesive and the elastomeric backing sheet are deemed to be suitable for use together in the present application if a stripping distance (the length of backing stripped from the adhesive) greater than about 1 inch is obtained and if the backing elongation is less than about 100 percent. The adhesive should not strip from the plate during the test. If stripping of the adhesive from the plate occurs, a suitable primer should first be applied to the plate.

In addition to meeting the requirements of the test set forth above, the backing sheet should be capable of being stretched at least 50% of its original length without breaking, and it should have a tensile strength of at least 200 pounds per square inch when tested as hereinafter described.

The backing will vary in thickness from about 4 to 50 mils and in width depending on the particular application. A convenient width for electrical insulating tape will be in the range of one fourth inch to 3 inches.

The elastomeric backing for the tape of the invention can be compounded from any of a variety of elastomers, such as EPDM elastomer (ethylene-propylene copolymer and a minor proportion of a diene with the residual unsaturated portion of the diene in the side chains), EPM elastomer (ethylene-propylene copolymer), polyisobutylene, butyl rubber, styrene butadiene rubber, natural rubber, polychloroprene rubber such as "Neoprene", acrylonitrile, silicone rubber, acrylate rubber, thermoplastic rubbers such as that sold under the trade designations "Kraton" styrene butadiene block copolymer, "Nordel 2722", and "TPR" pololefin rubber. The elastomer may be modified by the addition of various additives such as plasticizers, tackifiers, cross-linking agents, fillers, colorants, etc. Other additives may be incorporated for specific purposes, e.g., to make backing thermally conductive, electrically conductive, or reflective.

Elastomers based on polymers of ethylene and propylene are preferred for making the elastomeric backing for the tape of the invention. It has been found that ethylene-propylene elastomers provide a tough, resistant rubbery base to which the other components noted hereinafter may be added to give tapes having high chemical stability and resistance to environmental conditions. Tape backings having desirable strength, electrical and chemical properties may be formed of a composition in which the sole elastomeric component is an ethylene-propylene elastomer. Either copolymers of ethylene and propylene or terpolymers that include in addition a minor percentage of a nonconjugated diene such as dicyclopentadiene have been found useful. Ethylene and propylene are typically included in approximately equal weight amounts in the useful ethylene-propylene elastomers, ethylene comprising about 30–70 weight percent, and preferably 40–60 weight percent, of these elastomers for example. The higher molecular weight ethylene-propylene elastomers are somewhat more preferred because of their greater physical strength.

The backing composition may also include an elastomer based on isobutylene, such as butyl rubber or polyisobutylene. The inclusion of approximately equal weight percentages of ethylene-propylene and isobutylene elastomers has been found to give the best overall balance of properties. When about 15 weight percent of the elastomers are ethylene-propylene rubbers, a satisfactory resistance to outdoor exposure conditions including ultraviolet radiation, and ozone-filled atmospheres, and other conditions of outdoor weathering results; about 25 weight percent of the elastomers or more, however, is a preferred amount of ethylene-propylene rubber because of the high exposure resistance of the elastomer and the increased tensile strength it gives the tape.

The tape backing composition may be given added tensile strength, body, and handleability, and adapted to easier processing by the inclusion, preferably, of a thermoplastic resin such as polyethylene or polypropylene. As an alternative, these properties can be imparted to the composition by a partial vulcanization produced through the incorporation of small amounts (about 1 to 15 weight percent based on the elastomers) of a curing agent such as "Dicup T" (idcumyl peroxide), "Elastopar" (a nitrosoamine) or polymethylol phenol "Bakelike CKR 1634". Reinforcing fillers can also be used to strengthen the tape backing.

The strengthening effect of polyethylene or polypropylene that is associated with a preferred tape backing occurs with amounts of more than about 10 weight percent of the elastomeric components. Above about 50 weight percent of the elastomers, on the other hand, the increased strength provided by one of these resins is outbalanced by decreased elongation properties. Polyethylene, particularly high molecular weight polyethylene, is found to give the best results. Excellent results with polypropylene are achieved when it is added in smaller amounts, as about 15 weight percent based on the elastomers.

One or more resinous tackifiers, chosen on the basis of compatibility with and effectiveness in tackifying the principal elastomeric components, may be included in some tape backings to provide good adhering properties for the pressure-sensitive adhesive layer. Useful tackifiers will occur to those skilled in the art, but we have found such commercially available tackifiers as "Staybelite ester No. 10" (a glyceryl ester of hydrogenated rosin), "Piccolyte resin No. S-85" (a thermoplastic, terpene resin), and "Piccopale resin No. 100" (a petroleum hydrocarbon resin) to suitably tackify the elastomers when added in moderate amounts. The tackifiers will be included in the tape backing composition in an amount between about 5 and 75 weight percent of the elastomers, but the desirable amount of tackifier may vary somewhat with its effectiveness.

Plasticizers and softeners compatible with the elastomers also may be included in the tape backing composition to improve its stretch characteristics as well as to ease processing. Generally, about 25 weight percent of plasticizer based on the elastomers, and preferably not less than about 10 weight percent is present. Useful plasticizers include "Aroclor 1254" (a chlorinated polyphenol resin) and "Sunthene 2100" oil (a naphthenic rubber process oil) and "Stanolind oil" (a paraffin oil). Fillers such as soft clay, diatomaceous silica, and inorganic oxide may also be included, and for reasons of economy are, up to about 125 weight percent based on the elastomers. In certain formulations reinforcing fillers are desirable to strengthen and make more handleable the tape backing. Carbon black is usually included to color the tape.

Minor amounts of various additives may also be included in the backing compositions to enhance particular properties or add certain characteristics. For example, lubricants such as a low melting polyethylene or stearic acid and flame retardants such as particulate polyvinyl chloride resin together with antimony trioxide may be included.

The pressure-sensitive adhesive can be any of a variety of materials known for such use. These materials are generally elastomers or compositions based upon elastomers, including polyacrylates, acrylates, silicone rubbers, polyurethane, polyvinyl ethers, natural rubbers, and GRS rubbers. These elastomers may require the addition of a suitable compatible tackifying material to improve their adhesive tack (adhesiveness). Other additives may also be added to the elastomers such as vulcanizing agents, plasticizers, anti-slumping agents, anti-oxidants and fillers. The pressure-sensitive adhesives are aggressively tacky in their normal dry form on tape and have the proper four-fold balance of adhesion, cohesion, stretchiness and elasticity, which permits an elastomeric backing coated therewith to firmly adhere on mere contact with finger pressing, and yet to be stripped back from smooth surfaces to which they are temporarily applied without delamination or offsetting of the adhesive. Certain synthetic polymers and copolymers have a molecular structure such that they inherently have the desired tacky rubbery properties, permitting their direct use, without addition of a tackifying material, as a rubber-based pressure-sensitive adhesive.

The pressure-sensitive adhesive should be present in a thickness of at least one fourth mil to provide an adequate degree of adhesion to the types of surfaces usually encountered in electrical applications. Thicknesses of adhesive greater than about 3 mils should be avoided, since above such a thickness certain adhesive compositions tend to ooze from the side of the roll and, while the tape may still be useful, the adhesive on the side of the roll attracts dirt and other unwanted particulate material which could interfere with the electrical resistance. Additionally, the pressure-sensitive adhesive should have an adhesion to steel of at least 3 ounces per inch width as measured by ASTM D-1000, a higher degree of adhesion being desirable for some applications. Preferably the adhesion value should be greater than about 10 ounces per inch width.

A great variety of pressure-sensitive adhesive compositions have been employed in commercial practice and many others have been disclosed in publications. The present invention does not require the use of novel adhesives but involves the use in combination of a selected adhesive with a selected elastomeric backing, each of which individually may be old or new. The invention involves the selection of an adhesive and a backing which are physically incompatible and "suitable" for use together (as hereinabove explained) to obtain the presently desired result. A variety of such combinations can be selected from among previously known pressure-sensitive adhesive materials and elastomeric backing materials.

The preferred pressure-sensitive adhesives are formed of acrylate esters which are copolymerized with small proportions of additive copolymerizable monomers having strongly polar groups, viz., acrylic acid, methacrylic acid, acrylamide, methacrylamide, itaconic acid, or mixtures thereof, to provide adhesive masses which in the form of pressure-sensitive adhesive coatings are high in cohesive or internal strength while still retaining a high degree of stickiness or tackiness. Such adhesives are disclosed in U.S. Pat. No. Re. 24,906, the disclosure of which is incorporated herein by reference.

The tape of the invention can be prepared by utilizing conventional rubber compounding and tape coating techniques, as will be illustrated in the following examples. The ingredients comprising the backing material can be blended in a conventional rubber mill and thereafter sheeted to provide a uniformly thick layer which is coated with the pressure-sensitive adhesive. The adhesives may be applied to this layer by hot melt or solvent solution coating techniques, or by any other convenient method. The adhesive may also be first coated on a release liner and thereafter calendered or otherwise laminated to a superimposed elastomeric backing with the application of moderate heat and pressure.

The invention is further illustrated in the following Examples, wherein all parts are by weight unless otherwise specified.

The ethylene-propylene-diene terpolymer was placed on a 2-roll rubber mill and broken down, after which the polyisobutylene was added and the two milled together into a mixture. The polyethylene was then added to the batch and, while steam at a temperature between 270° and 330°F. was applied, the batch was cut back and forth until smooth. The terpene resin, the naphthenic rubber process oil, the carbon black, and the diatomaceous earth were next separately mixed together and then added to the rubber-thermoplastic combination. The combined mixtures were then cut back and forth for approximately 15 minutes under the applica-

Example 1

| Elastomeric backing sheet | Parts |
| --- | --- |
| Ethylene-propylene-diene terpolymer having a Mooney value of 70 ("Nordel 1070") | 50 |
| Butyl rubber containing about 1–1.4 mole percent isoprene ("Enjay Butyl 165") | 50 |
| High-molecular weight polyethylene having a weight average molecular weight of about 150,000, a nominal melt index (ASTM Test D 1238-57 T) of 0.6 ($I_2$ at 190°C.), and a density of 0.945 ("HiFax 1400 E") | 23.2 |
| Fine thermal carbon black ("P-33") | 7.8 |
| Diatomaceous earth ("Celite 270") | 61.4 |
| Naphthenic rubber process oil ("Sunthene 2100") | 25.2 |
| Termoplastic terpene resin ("Piccolyte Resin No. S-85") | 7.8 | tion again of steam having a temperature between 260° and 330°F. The final mixture was fed through a four-roll inverted "L" calender, with the top two rolls being heated to about 310°F., the center roll to about 305°F. and the lower roll to about 175°F. And, finally, the mixture was calendered onto a suitable release liner at a 30 mil thickness.

Pressure sensitive adhesive

Polymethylisoamyl acrylate adhesive was prepared according to U.S. Pat. No. Re. 24,906 by suspension polymerization of methylisoamyl acrylate and subsequently dissolved in a 73/27 heptane/toluene solvent mixture to give a 21% solids coatable solution. The solution was knife coated onto a release liner to provide a 1.2 mil thickness thereon after drying in a forced air oven with heating at about 150°F–200°F. The adhesive had an adhesion to steel value of 17 oz. per inch width when tested according to ASTM D-1000.

When the backing and the pressure-sensitive adhesive were tested for suitability for use together as hereinbefore described, the stripping distance was 1.7 inch with a 58% elongation, indicating the combination to be suitable for use together as an elastomeric backed pressure sensitive tape.

An elastomer backed pressure sensitive adhesive tape was prepared by calendering the backing layer onto the adhesive layer and removing the release liners. The tape was rolled on a one inch diameter cardboard core and itself in a 30 inch length, slit to a ¾ inch width and stored at 200°F. for 2 weeks. After such storage the tape could be easily dispensed from the roll without either offsetting of the adhesive or damaging the backing.

The tape was used to insulate a 34.5 kV solid aluminum cable spliced with a 34.5 kV No. 23 outdoor tape termination in accordance with well known procedures. The following electrical measurements were made on the splice in accordance with IEEE No. 48 pothead tests.

| Test Description | Test Results | IEEE No. 48 Test Voltage |
| --- | --- | --- |
| Corona Starting Voltage (kV-RMS at 4PC) | 39 | — |
| Corona Extinction Voltage (kV-RMS at 4PC) | 37 | — |
| 60 Hz Dry 1 Minute Withstand (kV-RMS) | 95 | 95 |
| Basic Impulse Insulation Level (kV-Crest) | +200 | 200 |
| 60 Hz Dry 6 Hour Withstand (kV-RMS) | 75 | 75 |
| Corona Starting Voltage (kV-RMS at 4PC) | 39 | — |
| Corona Extinction Voltage | 37 | — |

The tape was determined to have excellent electrical properties for insulating power cables.

Example 2

| Elastomeric backing sheet | Parts |
| --- | --- |
| Ethylene-propylene-diene terpolymer ("Nordel 1070") | 50 |
| Butyl rubber ("Enjay Butyl 165") | 50 |
| High-molecular weight polyethylene ("HiFax 1400 E") | 23.2 |
| Fine thermal carbon black ("P-33") | 7.9 |
| Diatomaceous earth ("Celite 270") | 61.6 |
| Naphthenic rubber process oil ("Sunthene Oil No. 2100") | 25.3 |
| Hard, brittle, solid, glyceryl ester of hydrogenated resin having a specific gravity of 1.08 and a melting point of 85°C. ("Staybelite Ester No. 10") | 1.7 |
| Thermoplastic terpene resin ("Piccolyte Resin No. S-85") | 29.4 |

A 30 mil elastomeric backing sheet was prepared of the ingredients shown above by the technique described in Example 1.

| Pressure sensitive adhesive | Parts |
|---|---|
| Crude rubber | 100 |
| Sumatra yellow | 1.46 |
| Zinc oxide | 19.42 |
| Titanium dioxide | 19.42 |
| Thermoplastic polyterpene resin ("Piccolyte S-85") | 34.95 |
| Heat-treated wood rosin having a melting point of 74°C and an acid number of 151 ("Tenex Rosin") | 19.42 |
| Oil-soluble heat-reactive para-substituted phenol aldehyde tackifier resin ("Bakelite CKR 14634") | 19.42 |
| Zinc resinate having a melting point of 164°C and acid number of zero ("Zirex Resin") | 4.80 |
| 2,5-ditert-amylhydroquinone antioxidant ("Santovar A") | 0.6 |
| Heptane | 402 |

A coatable mixture, prepared by blending the ingredients shown above, was knife coated upon a release liner to provide, after drying by solvent evaporation under ambient conditions, a 1.2 mil adhesive layer.

When tested for suitability for use together as described above, a stripping distance of zero inch with greater than 136% elongation was obtained, indicating the combination to be unsuitable for the present invention. Accordingly, when the adhesive layer was calendered on the backing sheet and the resultant coated sheet rolled and stored for 24 hours at room temperature, the roll could not be unwound without destroying the tape.

EXAMPLE 3

Elastomeric backing sheet
  Described in Example 1.
Pressure sensitive adhesive
  Described in Example 2
The suitability evaluation of this combination revealed no stripping distance with greater than 136% elongation, indicating the combination to be useless for an elastomeric tape.

EXAMPLE 4

Elastomeric backing sheet
  Described in Example 1
Pressure sensitive adhesive tape
  Isooctyl acrylate/acrylic acid (95.5:4.5) copolymer adhesive (300 parts) prepared according to Example 5 of U.S. Pat. No. Re. 24,906 was dissolved in 100 parts 70/30 heptane/isopropanol to provide a coatable solution which was knife coated onto a release liner to provide a 1.2 mil adhesive layer after drying. The adhesion to steel was found to be 23 ounces per inch width.

When the backing and adhesive were evaluated for suitability as described above, a stripping distance of 3 inches with 18.4% elongation was obtained, indicating the combination to be useful as a pressure sensitive tape.

Accordingly, a tape prepared from the combination and stored in roll form for 24 hours at 65°F dispensed easily from the roll without either offset of adhesive or tape damage.

Example 5

| Elastomeric backing sheet | Parts |
|---|---|
| Poly(epichlorohydrin/ethylene oxide) elastomer having an average molecular weight of at least 1,000,000, a Mooney viscosity (ML-4) at 212°F of 180–120 ("Hydrin 200") | 100 |
| Carbon black ("P-33") | 20 |
| Talc ("Mistron Vapor" talc) | 40 |
| Polyester plasticizer designated "Polyester A" ("Admex 4916") as disclosed in U.S. Pat. No. 3,129,816 | 10 |
| Modified dibasic lead phosphite ("Dyphos XL") | 5 |
| Modified dibasic lead phthlate ("Dythal XL") | 7 |
| 2-mercaptoimidazoline ("NA-22") | 0.75 |

The ingredients shown above were uniformly blended and calendered to form a 30 mil sheet which was cured on a self-supporting layer by heating at 380°F for 30 minutes in an autoclave.

Pressure sensitive adhesive
  Described in Example 4
Suitability evaluation of the backing and the adhesive revealed a stripping distance of 3.5 inches with a 6% elongation, indicating the combination to be useful as an elastomeric backed pressure sensitive adhesive tape.

Accordingly, a tape, prepared of a 1.2 mil adhesive layer and 30 mil backing sheet calendered together, dispensed easily from a roll after storage as such for 24 hours at 65°C.

Example 6

| Elastomeric backing sheet | Parts |
|---|---|
| Ethylene-propylene-diene terpolymer ("Nordel 1070") | 50 |
| Polyisobutylene having a (Staudinger) viscosity average molecular weight range of about 99,000 to 117,000 ("Vistanex L-120") | 50 |
| Fine thermal carbon black ("P-33 Black") | 7.5 |
| Polypropylene having a nominal melt flow 4 as measured by ASTM D-1238 ("Profax 6523") | 23.2 |
| Talc ultrafine silicate filler ("Mistron Vapor") | 61.2 |
| Polybutene having a number average molecular weight of 2700 ("Oronite" 128) | 14.4 |
| Paraffinic rubber process oil ("Sun Par 2280") | 16.1 |
| Thermoplastic terpene resin ("Piccolyte Resin No. S-85") | 16.1 |
| Zinc resinate of wood rosin having an acid number of zero ("Zirex Resin") | 2.1 |
| Vinyl-tris(beta methoxyethoxy)silane ("A-172 Silane") | 2.1 |

The ingredients above were blended and sheeted according to the procedure described in Example 1 to produce a 30 mil elastomeric sheet.

| Pressure sensitive adhesive | Parts |
|---|---|
| Silicone resin [(CH₃)₃SiO₀.₅]₄(SiO₂)₄ copolymer (3000 molecular weight) in a 60% xylene solution (the solution sold under the trade designation "G.E. CR-524A") | 135 |
| Dimethyl siloxane diphenyl siloxane copolymer (87:13) having a refractive index of 1.466 at 23°C ("GE CR-524B") | 45 |
| Toluene | 3 |
| Benzoyl peroxide | 3 |

The mixed ingredients were coated onto a 5 mil Teflon polytetrafluoroethylene release liner and dried to give a 1.3 mil adhesive film.

Suitability evaluation of the combination revealed a 2.6 inch stripping distance with 28% elongation, indicating the combination to be suitable.

A tape was prepared by laminating the adhesive layer to the backing layer under pressure while heating the combination at 250°F. The tape dispensed easily from a roll after storage as such for 1 week at 65°C. The adhesion value of the adhesive was 38 ounces per inch width.

Example 7

| Elastomeric backing sheet | Parts |
|---|---|
| Dimethyl siloxane gum ("Silastic 50U") | 100 |
| Colloidal silica ("Cab-O-Sil") | 4.7 |
| Carbon black ("P-33") | 0.5 |
| 2,4-dichlorobenzol peroxide, 50% solution in silicone oil ("Cadox TS-50") | 1.49 |

A 13 mil sheet of the blended mixture was cured by 1 minute contact with a 350°F. surface.

| Pressure sensitive adhesive | Parts |
|---|---|
| Silicone resin copolymer solution ("G.E. CR-524 A") | 54 |
| Dimethyl siloxane diphenyl siloxane copolymer ("G.E. CR-524 B") | 45 |
| Toluene | 62 |
| Benzoyl peroxide | 3 |

A tape was prepared by first calendering the 13 mil freshly formed backing sheet onto the corona primed surface of a 10 mil polytetrafluoroethylene carrier film, the carrier film being subjected to a corona discharge of 10,000 volts, 400 cycles per sec, 18 amperes at a web speed of 20 feet per minute. After curing the backing sheet as described above, it was knife coated with a mixture comprised of the adhesive ingredients shown above, providing a dry coating weight of about 9 grains per 24 square inches. As initially prepared, the adhesion to steel was 13 ounces per inch width, this value dropping to 8 ounces per inch width after storage for two months.

A roll of the tape was easily and cleanly unwound, even after two months storage under ambient conditions and one week at 150°F.

EXAMPLE 8

Two tapes were prepared with the isooctylacrylate:acrylic acid copolymer adhesive of Example 4 and the backing sheet described in Example 6 as described above. One tape was wound into a roll in the conventional manner with the adhesive layer in and the other with the adhesive layer out. The conventionally wound tape could be readily unwound without adhesive offsetting even after aging for 7 days at 65°C. The adhesive of other tape split between the backing surface and the adjacent layer as it was unwound, indicating the need for a primer for some situations.

Example 9

| Rubber resin primer | Parts |
|---|---|
| Crude rubber | 50 |
| Styrene-butadiene rubber | 50 |
| 2,5-ditert-amylhydroquinone antioxidant ("Santovar A") | 2 |
| Aluminum trihydrate ("Hydral 705") | 10 |
| Calcium carbonate | 50 |
| Oil soluble heat reactive parasubstituted phenol aldehyde resin ("CK 1634") | 12 |
| Dioctyl phthalate | 6.4 |
| Fine thermal carbon black | 10 |
| Thermoplastic hydrocarbon resin having a ball and ring melting point of 100°C ("Piccopale 100") | 18 |
| Pale thermoplastic resin derived from the polymerization of mixed olefins, the resin having a ball and ring softening point of 100°C ("Sta Tac B") | 72 |
| Ethyl alcohol | 12 |
| Heptane | 2177 |

A tape was prepared by calendering and hot (250°F) laminating the isooctylacrylate acrylic acid adhesive described in Example 4 to the backing described in Example 6. The adhesive layer had been precoated using a "Meyer" bar with 6 mil wires with a primer comprised of the ingredients shown above. This tape could be unwound without adhesive splitting when wound into a roll with the adhesive layer being "in" or "out", the same being true even after storage of the rolls at 65°C for one week.

EXAMPLE 10

Conductive pressure sensitive adhesive

An electrically conductive pressure sensitive adhesive was prepared by mixing 100 parts of a 23% solids solution of 96:4 isooctylacrylate:acrylamide copolymer (the copolymer prepared according to Re. 24,906) dissolved in essentially equal parts of ethyl acetate and heptane with 7 parts conductive carbon black ("Cabot XC-72") and a mixture of 29 parts ethyl acetate and 14 parts heptane.

| Conductive elastomeric backing | Parts |
|---|---|
| Ethylene-propylene-diene terpolymer ("Nordel" 1070) | 50 |
| Polyisobutylene ("Vistanex" L-120) | 50 |
| Butyl rubber ("Butyl 165") | 33.3 |
| Polypropylene ("Profax 6523") | 33.3 |
| Conductive carbon black ("Vulcan XC-72") | 127 |
| Polyisobutylene having a (Staudinger) viscosity average molecular weight range of about 10,000 to 17,000 ("Vistanex LM-MH") | 66.6 |
| Pale thermoplastic resin derived from the polymerization of mixed olefins having a ball and ring softening point ("Sta Tac B") | 40 |

An electrically conductive tape was prepared by laminating a 29 mil thickness of a backing formed of the materials shown above to a 1.2 mil thickness of an adhesive produced from the mixture shown above. The resulting tape could be readily unwound from a roll thereof without adhesive transfer even after the roll was stored at 65°C.

The adhesion to steel of the adhesive was 3 ounces per inch width. The tape conductivity was 5370 ohms/-square measured on its back surface and 5330 ohms/-square on its adhesive face.

The tapes of the Examples were also tested for dielectric strength in accordance with ASTM D-1000 and for tensile strength and % elongation at break by using an "Instron" tensile testing device at a crosshead speed of 12 inches per minute with 0.5 inch-wide sample using an initial separation between the jaws gripping the tape of one half inch. Ultraviolet resistance was determined by wrapping the tape at an elongation of 400 percent or more on a 15/16 inch diameter cardboard tube to a thickness of one eighth inch, subjecting to a General Electric UA-11 bulb at a distance of 20 inches for 8 hours, and observing if stress cracking occurred. Ozone resistance was determined by subjecting the tape to an atmosphere containing 0.015 volume percent ozone while wrapped on a test core at a 300 percent elongation, and observing the damage. The test results are shown in the Table.

TABLE

| Example No. | Backing Tensile Strength lb/in | Dielectric Strength (volts/mil) | % Elongation at break | Ozone Resistance | UV Resistance |
|---|---|---|---|---|---|
| 1. | 240 | 1250 | 1700 | passes test | passes test |
| 2. | — | — | — | — | — |
| 3. | — | — | — | — | — |
| 4. | 230 | 1150 | 300 | passes test | passes test |
| 5. | 1360 | 240 | 1340 | " | " |
| 6. | 240 | 1200 | 1600 | " | " |
| 7. | 1050 | 1250 | 300 | " | " |
| 8. | — | — | — | — | — |
| 9. | 240 | 1200 | 1600 | passes test | passes test |
| 10. | 200 | (conductivity 5300 ohms per square) | 1650 | " | " |

What is claimed is:

1. A linerless electrically insulating tape which has immediate adhesion to insulation and metal conductor surfaces yet can be wound upon itself and stored in roll form for prolonged periods and can thereafter be unwound without damage thereto, consisting essentially of in combination, an elastomeric backing sheet having a thickness in the range of about 4 to 50 mils and a tensile strength of at least 200 pounds per square inch and, coextensive with and firmly united to one major surface of the backing sheet, a layer at least 0.4 mil in thickness of a pressure-sensitive elastomeric acrylate ester copolymer adhesive, said elastomers being physically incompatible, said adhesive having adhesion to steel of at least 3 ounces per inch width, said backing sheet and said adhesive being selected to provide a stripping distance of greater than 1 inch and an elongation of less than 100% when a one inch wide strip of said backing sheet, adhered under pressure of a 2.2 lb roller to the surface of a layer of said adhesive which is first adhered to the polished surface of a steel plate, is pulled from said adhesive surface at an angle of 180° at the rate of 12 inches/minute, said backing sheet having been prepared from a composition comprising 100 parts by weight of an ethylene-propylene elastomer, between 5 and 75 parts by weight of a resinous tackifier, up to 50 parts by weight of a reinforcing thermoplastic resin selected from the group consisting of polyethylene and polypropylene and up to 15 parts of curing agent for the elastomer, at least one of the thermoplastic resins or the curing agent being included, the backing sheet further containing from 10 to 50 parts of plasticizers and up to 125 parts of fillers, both by weight.

2. The tape of claim 1 wherein said 100 parts of elastomer consists of 25–75 parts of an ethylene propylene copolymer and the balance is an isobutylene polymer.

3. The composition of claim 2 wherein the thermoplastic resin is polyethylene.

* * * * *